United States Patent
Yang et al.

(10) Patent No.: US 8,184,164 B2
(45) Date of Patent: May 22, 2012

(54) METHOD FOR MEASURING MULTIMEDIA VIDEO COMMUNICATION QUALITY

(75) Inventors: Fuzheng Yang, Shenzhen (CN); Zhong Luo, Shenzhen (CN); Shuai Wan, Shenzhen (CN); Yilin Chang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1373 days.

(21) Appl. No.: 11/793,546

(22) PCT Filed: Jun. 23, 2006

(86) PCT No.: PCT/CN2006/001433
§ 371 (c)(1),
(2), (4) Date: Jun. 18, 2007

(87) PCT Pub. No.: WO2007/000103
PCT Pub. Date: Jan. 4, 2007

(65) Prior Publication Data
US 2008/0273861 A1 Nov. 6, 2008

(30) Foreign Application Priority Data
Jun. 25, 2005 (CN) .......................... 2005 1 0035566

(51) Int. Cl.
*H04N 17/00* (2006.01)
*H04N 17/02* (2006.01)
(52) U.S. Cl. ........ 348/192; 348/193; 348/180; 382/309; 382/100; 382/375; 382/224; 382/225; 382/226; 382/227; 702/69; 714/715; 714/819; 714/820
(58) Field of Classification Search .................. 348/192, 348/193; 382/100, 375, 224, 225, 226, 227; 702/69; 714/715, 819, 820
See application file for complete search history.

(56) References Cited

U.S. PATENT DOCUMENTS
6,496,221 B1 * 12/2002 Wolf et al. .................... 348/192
(Continued)

FOREIGN PATENT DOCUMENTS
CN 1514409 A 7/2004
(Continued)

OTHER PUBLICATIONS
English-language translation of Written Opinion of the International Searching Authority issued in PCT Application No. PCT/CN2006/001433 on Oct. 26, 2006.
(Continued)

*Primary Examiner* — Jefferey Harold
*Assistant Examiner* — Mustafizur Rahman
(74) *Attorney, Agent, or Firm* — Conley Rose, P.C.; Grant Rodolph

(57) ABSTRACT

A method for measuring multimedia communication quality is disclosed. The multimedia video communication quality may be objectively reflected through the embedment and extraction of digital watermark under a precondition that the quality of the multimedia video data is not obviously affected. In the invention, each frame of the multimedia video data is uniformly divided into blocks of equal size and watermark data is embedded in each of the blocks, so that the watermark may be uniformly distributed. The multimedia video data are divided into groups, and the watermark is embedded in a part of the frames with equal interval between the frames in each group to reduce the effect of the watermark on the data. The watermark information is directly embedded in the spatial domain of the original video data. The PSNR of the video data is linearly fitted using the accuracy rate of the recovered watermark relative to the original watermark, and the fitted PSNR is regarded as a measurement indication of the multimedia video communication quality. Post-processing such as smoothing filtering is performed on video frames after watermark extraction to eliminate the effect of the watermark on the multimedia video data quality.

15 Claims, 4 Drawing Sheets

U.S. PATENT DOCUMENTS

| | | | |
|---|---|---|---|
| 6,943,827 B2* | 9/2005 | Kawada et al. | 348/180 |
| 7,710,499 B2* | 5/2010 | Cooper | 348/515 |
| 2002/0157005 A1 | 10/2002 | Brunk et al. | |
| 2003/0112996 A1 | 6/2003 | Holliman et al. | |
| 2003/0152225 A1* | 8/2003 | Kunisa | 380/210 |
| 2004/0151313 A1 | 8/2004 | Weirauch | |
| 2005/0036613 A1* | 2/2005 | Zhou et al. | 380/203 |
| 2005/0078851 A1* | 4/2005 | Jones et al. | 382/100 |
| 2007/0223778 A1* | 9/2007 | Hobson et al. | 382/100 |

FOREIGN PATENT DOCUMENTS

| | | |
|---|---|---|
| CN | 1556500 A | 12/2004 |
| JP | 2004348293 A | 12/2004 |
| WO | 2004/102477 A1 | 11/2004 |

OTHER PUBLICATIONS

First Office Action issued in the corresponding Japanese Application No. 2007-549787 and mailed on May 18, 2010, with a partial English-language translation.

Second Office Action issued in the corresponding Japanese Application No. 2007-549787 and mailed on Oct. 5, 2010, with a partial English-language translation.

First Office Action issued in the priority Chinese Application No. 200510035566.9 and mailed on Mar. 7, 2008, with a partial English-language translation.

Second Office Action issued in the priority Chinese Application No. 200510035566.9 and mailed on May 16, 2008, with a partial English-language translation.

First Office Action issued in the corresponding Chinese Application No. 200680012271.2 and mailed on Nov. 7, 2008, with a partial English-language translation.

First Office Action issued Aug. 12, 2008 and Oral Proceedings issued Mar. 26, 2009 in the corresponding EPO Patent Application No. 06753011.

Hiroyuki Kobayashi et al., "A Method for Lossless Watermaking Using Hash Function and Its Application for Broadcast Monitoring", The Institute of Image Information and Television Engineers (Corporation), Tokyo, Japan, Feb. 3, 2004, vol. 28, No. 7, with a partial English-language translation.

Shuai Wan, et al., "Error Concealment for Video Transmission Based on Watermaking", International Conference on Computational Intelligence and Security CIS2005, LNCS 3802, Springer, pp. 597-604.

Campisi, P., et al., "Blind Quality Assessment System for Multimedia Communications Using Tracing Watermarking," IEEE Transactions on Signal Processing, vol. 51, No. 4, (Apr. 2003).

* cited by examiner (a)

(b)

METHOD FOR MEASURING MULTIMEDIA VIDEO COMMUNICATION QUALITY

FIELD OF THE INVENTION

The present invention relates to multimedia communication technology, and particularly to a method for measuring multimedia video communication quality.

BACKGROUND OF THE INVENTION

With the arrival of multimedia information age, various multimedia processing and communication technologies, especially video processing and video communication technologies emerge. Accordingly, quality evaluation for digital video is becoming more and more important. The digital video is the most primary media form for multimedia video communication nowadays. A network streaming media (e.g. a network movie, a network TV and so on), a video conference and a video telephone etc. are all multimedia applications based on video. Customer satisfaction on a multimedia application service relies on video quality to a great extent. Digital video signal transmission includes some processes such as sampling, quantifying, compression coding, network transmitting, decoding and restoring for an analog video signal, wherein in some processes, especially, network transmitting without guaranteeing QoS (Quality of Service) (e.g. packet transmission network), errors and information distortion may be introduced in each process, thus leading to a decreased customer satisfaction. Multimedia video communication quality is a measurement for measuring distortion of a digital multimedia signal relative to an original signal. Video quality evaluation plays a very important role in the field of video compression, processing and video communication. Performance of a real-time or non real-time video system and the QoS of various video communication transmission channels are finally reflected by the video quality, and feedback for adjusting parameters of a codec or a channel is given, thus guaranteeing the video quality within an acceptable range. An easy to understand measurement for output video quality of various different codecs is presented so that the performance of the codec may be designed, evaluated and optimized. A graphics and image display system according with a human visual model is designed and optimized.

Two factors affecting the video quality in a wireless and IP (Internet Protocol) transmission video system are: one is that the video quality is degraded due to video compression; the other is that the video quality is affected by channel packet loss and random error codes due to relatively bad channel environment, especially video contents are damaged by various errors of header information and motion vectors. Some unendurable mosaic blocks are often formed in these damaged video contents, and greatly affect the subjective quality of the recovered video. Therefore, video quality measurement, feedback correction and test development based on the measurement are desired for the current multimedia video communication evolving towards a direction of wireless and IP transmission.

The video quality evaluation is also very significant for video communication equipment manufacturers and telecom operators. For the equipment manufacturers, providing a convictive video quality evaluation result of a system may greatly facilitate the sale of their products. For the operators, the evaluation data of the video quality may be used for popularization and propagation of their services. In addition, developing an automatic real-time video quality evaluation method, based on which both the manufacturers and the operators are capable of performing real-time monitoring to video equipment, will facilitate trouble shooting and fault diagnosis.

The video quality evaluation may be classified into subjective quality evaluation and objective quality evaluation. A result of the subjective quality evaluation is reliable, but the evaluation for video subjective quality is strict with a Human Test Subject because it relies on participation of the Human Test Subject, the process of which is complicated and hard to be widely applied, especially for evaluation in an application environment with real-time demand. The objective quality evaluation measures the video quality using a quantifying method from another aspect, and may be performed automatically with high efficiency and without human participation.

The objective quality evaluation may be further classified into three categories:

(1) Full Reference Model in need of a full original video sequence;

(2) Partial Reference Model only in need of partial statistic characteristics of an original video sequence;

(3) Referenceless Model without need of any information of an original video sequence.

The full reference and the partial reference evaluation methods are not widely used because the needed reference video sequence generally cannot be obtained in practical applications, so a new objective real-time video quality evaluation method without need of any reference information is desired. At present, the VQEG (Video Quality Experts Group) is dedicated to research methods and constitute standards for the referenceless video quality evaluation.

PSNR (Peak Signal-to-Noise Ratio) is most widely used among numerous objective quality evaluation indications, because it is easy to be calculated, has apparent physical meaning and may actually reflect a distortion degree of an image.

Digital media is easy to be accessed, copied, transmitted and edited, while some problems such as pirating a digital media copyright and interpolating digital media contents will arise. Thus a digital watermark technique early used for protecting a digital media copyright is presented.

The digital watermark technique is developed and widely used in recent years. Watermark information embedded in original media data always coexists with the original media data by embedding a series of information in the original media data, thus the copyright of the original media data and the integrity of contents may be protected. With development of technologies, besides copyright protection, the digital watermark technique may be used in many other fields. For example, the multimedia video communication quality measurement mentioned above may be achieved by embedding and extracting a digital watermark, which is a Partial Reference Model method, without knowing an original video image but indirectly reflecting status of the original image with reference to a watermark image before channel transmission and a distorted watermark image after channel transmission, accordingly the quality measurement, calculation and evaluation are performed.

The digital watermark may be embedded in any portion of the original data, but its effect on the original data needs to be reduced to the utmost extent. The digital watermark technology may be classified into a digital watermark technology of the spatial domain and a digital watermark technology of the transform domain according to digital watermark embedding approaches. In the digital watermark technology, watermark information is directly embedded in the spatial domain of a media. For example, the information is embedded in pixels of an image. In the digital watermark technology of the transform domain, a transform is performed on a media firstly, such as DFT (Discrete Fourier Transform), DCT (Discrete Cosine Transform) or DWT (Discrete Wavelet Transform) etc., and then the watermark information is embedded in the transform domain.

FIG. 1 shows a block diagram illustrating a principle of a digital watermark. In this figure, the master media $I_0$ generally is original or compressed multimedia data such as video or audio etc., and the data $b_0$ to be hidden only has less data in comparison with $I_0$. The difference between the media $I_1$ embedded with a watermark and $I_0$ is distortion caused by the embedded watermark. In general, such distortion is not desired to be perceived by human. The media $I_2$ is obtained by performing some processing on $I_1$, such as data compression, noise contamination and intended attacks to the watermark, which may be regarded as noise. Therefore, the watermark $b_1$ extracted from $I_2$ may be distorted to a certain extent in comparison with the original watermark $b_0$. If $I_2$ is identical with $I_1$, the watermark $b_1$ extracted from $I_2$ should be identical with the original watermark $b_0$.

A common mathematical model for watermark embedding and extracting is: $I_0$ and $I_1$ respectively represent the original data and the data embedded with the watermark, $b_0$ represents the original watermark, the watermark embedding process may be expressed as: $I_1=I_0+f(I_0,b_0)$, wherein $f(I_0,b_0)$ represents a watermark embedding algorithm. The watermark measurement process may be expressed as: if $H_0$: $b_1=I_2-I_0=N$, the watermark does not exist; if $H_1$: $b_1=I_2-I_0=b_0+N$, the watermark exists. N represents noise. For example, the noise may be caused by data compression, noise contamination and intended attacks to the watermark etc. The data embedded with the watermark will be distorted to a certain extent after processing, so the watermark measured from the processed data may be different from the original watermark to a certain extent.

Watermark measurement technology is commonly implemented by the classical Signal Detection technology, which is used for researching how to determine whether a destination signal exists in noise, such as whether a reflecting signal from a destination is contained in a radar echo signal, and if the destination signal exists, how to perform optimal signal extraction using a statistic principle. Statistic Hypothesis Test/Validation is used for determining whether a signal exists in noise. A watermark measurement process includes: presenting two hypotheses $H_0$ and $H_1$, determining which hypothesis is true according to a test result, and accordingly knowing whether a watermark exists.

At present, all the methods for multimedia (video and images) quality evaluation based on digital watermark comply with a same principle. FIG. 2 shows a block diagram illustrating a principle of a video communication quality measurement based on a digital watermark, and the basic principle of which will be described hereinafter.

A watermark image, which is very small relative to an original image, is embedded in the original image, thus the added additional data quantity is negligible in comparison with the data quantity of the original image, and has little effect on the multimedia quality. The original image embedded with the watermark is distorted after passing through a transmission channel, and the watermark image extracted from which will be accordingly distorted. The watermark is embedded in the original image everywhere, so the quality measurement for the watermark image is equivalent to the measurement for the original image after distributed sampling. As long as the distribution of the watermark is uniform enough, the quality of the distorted image may be sufficiently reflected by measuring the quality of the watermark image. While the original image is shared by both sides of a communication, the receiving side measures communication quality by comparing the recovered watermark image with the known original watermark image, thus the quality evaluation for the watermark is actually a kind of evaluation with reference.

FIG. 3 shows an example of measuring the multimedia video communication quality based on a digital watermark. The left is an original watermark image, which is a black-and-white (easy to determine error positions) bi-level image. The middle is a distorted image of an international standard test image Lena after being embedded with the watermark and JPEG (Joint Photographic Experts Group) standard compression and network packet loss during a transmission process, wherein there are three obvious block distortions in the image. The right is a recovered watermark extracted from the distorted Lena image, wherein scatteredly distributed black spots and white spots are distortions due to the compression, while big black and white blocks, the positions of which correspond to three obvious distortions in the recovered Lena image, are caused by errors such as packet loss.

SUMMARY OF THE INVENTION

According to an embodiment of the present invention, there is provided a method for measuring multimedia video communication quality. The method is an objective quality evaluation, so that the multimedia video communication quality may be objectively reflected by embedding and extracting a digital watermark under a precondition that the quality of the multimedia video data is not obviously affected According to an embodiment of the present invention, there is provided a method for measuring multimedia video communication quality, including:

embedding original watermark data in multimedia video data uniformly at a transmitting side, and transmitting the multimedia video data to a receiving side;

extracting a recovered watermark from the received multimedia video data at the receiving side;

calculating a distortion degree of the recovered watermark relative to the original watermark.

Preferably, the method may also includes: uniformly embedding the original watermark in the original multimedia data, performing compression coding or data packaging or framing at the transmitting side, and transmitting the data to the receiving side.

Preferably, the method may also include: uniformly dividing the multimedia video data frames into blocks of equal size, and embedding equal amount of the original watermark data in a part of the blocks or all of the blocks at the transmitting side.

The method further includes: dividing the multimedia video data into groups at the transmitting side, each group including equal number of frames, and selecting at least two frames with equal interval in a same group as embedded frames, uniformly dividing each of the embedded frame into a plurality of blocks of equal size, selecting equal number of blocks from the plurality of blocks as embedded blocks, and embedding equal amount of the original watermark data in each of the embedded block.

Each multimedia video data frame includes M rows×N columns pixels in which the M rows are numbered from 0 to M−1 and the N columns are numbered from 0 to N−1, and uniformly dividing a multimedia video data frame into blocks of equal size includes:

dividing each multimedia video data frame into m strips numbered from 0 to m−1, the strip i(i=0, 1, . . . , m−2)

including pixels from row i×k, to row $(i+1)×k_v-1$, and the strip m−1 including pixels from row $(m-1)×k_v$ to row M−1, wherein m is a minimum integer greater than or equal to $M/k_v$; if $m=M/k_v$, the strip m−1 including zero row of pixels;

dividing the strip i (i=0, 1, . . . , m−1) into n blocks numbered from i×n to (i+1)×n−1, the block i×n+j (0, 1, . . . , n−2) including pixels from column $j×k_h$ to column $(j+1)×k_h-1$ of this strip, and the block n−1 including pixels from column $(n-1)×k_h$ to column N−1, wherein n is a minimum integer greater than or equal to $N/k_h$; if $n=N/k_h$, the strip n−1 including zero column of pixels;

embedding equal amount of the original watermark data in each of the obtained m×n blocks.

Each frame of the multimedia video data is uniformly divided into L blocks numbered from 0 to L−1, and the embedding the original watermark further includes:

dividing a frame sequence into groups, each group including P×Q frames, which sequentially are frame 0 to frame P×Q−1 of the group;

selecting a frame q×P (q=0, . . . , Q−1) of each group as the embedded frame;

selecting a block q+r×Q (r=0, . . . , R−1, and q+r×Q≦L) of the embedded frame q×P (q=0, . . . , Q−1) as the embedded block, wherein R is a maximum integer less than or equal to L/Q; embedding equal amount of the original watermark data in all the embedded blocks of the group.

Preferably, the method may also includes: determining a bit number of the original watermark data embedded in a part of the blocks or all of the blocks according to the size of the data block.

Embedding 1-bit data of the original watermark in the multimedia video data block includes:

calculating an average value μ of the multimedia video data block according to pixels;

modifying a value of each pixel in the multimedia video data block according to b'=b+c, wherein, b' is a modified value of a pixel, b is a value of the pixel before modification, and c is a modification amount;

the modification amount is calculated according to the following formula:

when the original watermark data bit is 1, $$c = \begin{cases} -A/2 - \gamma & (0 \le \gamma < A/2) \\ 3A/2 - \gamma & (A/2 \le \gamma < 3A/2) \\ 3A/2 - \gamma & (3A/2 \le \gamma < 2A) \end{cases}$$

when the original watermark data bit is 0, $$c = \begin{cases} A/2 - \gamma & (0 \le \gamma < A/2) \\ A/2 - \gamma & (A/2 \le \gamma < 3A/2) \\ 5A/2 - \gamma & (3A/2 \le \gamma < 2A) \end{cases}$$

wherein γ is a remainder of μ being divided by 2A, A represents an embedding strength and is equal to $2×Q_P-1$, and $Q_P$ represents a quantization factor for the multimedia video communication compression coding.

Extracting a data bit of the recovered watermark from the received multimedia video data block includes:

calculating an average value μ' of the received multimedia video data block according to pixels;

calculating extracted data w' of the recovered watermark according to the following formula:

$$w' = \begin{cases} 0 & (0 \le \gamma' < A) \\ 1 & (A \le \gamma' < 2A) \end{cases}$$

wherein γ' is a remainder of μ' being divided by 2A, A represents an embedding strength and is equal to $2×Q_P-1$, and $Q_P$ represents a quantization factor for the multimedia video communication compression coding.

The method further includes:

calculating a Peak Signal-to-Noise Ratio using a Pixel Recovery Rate of the recovered watermark relative to the original watermark to measure objective quality of the multimedia video communication;

fitting to obtain an estimated value of the Peak Signal-to-Noise Ratio using a linear function of the Pixel Recovery Rate of the recovered watermark relative to the original watermark based on statistic data of a multimedia video communication experiment and according to a Mean Square Error criterion to measure the objective quality of the multimedia video communication.

Preferably, the method may also include: calculating the distortion degree of the recovered watermark relative to the original watermark to measure the objective quality of the multimedia video communication.

The method also includes: calculating the distortion degree of the recovered watermark relative to the original watermark using the Pixel Recovery Rate of the recovered watermark relative to the original watermark.

Preferably, the method may also include: on extracting the recovered watermark, post-processing the received multimedia video data to eliminate effect of the watermark embedment, wherein the post-processing includes one of the following smoothing filtering, median filtering, neural network filtering, mathematical morphology filtering and filtering based on fuzzy mathematics methods.

The method also includes:

determining the original watermark, relevant parameters and a strategy for embedding the original watermark and extracting the recovered watermark through a communication negotiation between the transmitting side and the receiving side.

determining the original watermark, the relevant parameters and the strategy for embedding the original watermark and extracting the recovered watermark at the transmitting side, and informing the receiving side before communication.

For a color image, the original watermark is embedded in a luminance component of the original multimedia data.

For a multi-channel image, the original watermark is embedded in one or more channels of the original multi-channel image data.

The original watermark is a bi-level image.

According to the technical solution of the embodiments of the present invention, each frame of the multimedia video data is uniformly divided into blocks of equal size, and the watermark data is embedded in each block for completely uniform watermark distribution. Thus the accuracy of reflecting the multimedia video communication quality by the watermark is improved.

Moreover, frames of the multimedia video data are divided into groups and the watermark is uniformly embedded with equal interval in a part of the frames in each group for completely uniform watermark distribution. The amount of the watermark information is decreased. The effect of the watermark embedment on the multimedia video data is reduced. The multimedia video communication quality is ensured and measured accurately.

In addition, the watermark information is directly and uniformly embedded in the original multimedia data or the video spatial domain, so that the watermark may be completely equivalent to an intuitive quality reflection of multimedia or video, and the accuracy of the multimedia video communication quality evaluation is improved.

Post-processing such as smoothing filtering is performed on the video image after watermark extraction to eliminate the effect of the watermark on the multimedia video data quality.

A linearly fitted PSNR of the multimedia video data using the accuracy rate of the recovered watermark relative to the original watermark is regarded as a measurement standard for the multimedia video communication quality, which is able to reflect the communication status accurately.

Post-processing such as smoothing filtering, median filtering, neural network filtering, mathematical morphology filtering or filtering based on fuzzy mathematics methods is performed on the video image after watermark extraction to eliminate the effect of the watermark on the multimedia video data or video quality.

According to an embodiment of the present invention, using the method of dividing into blocks and groups for uniformly embedding the watermark in the multimedia video data, the amount of watermark information may be reduced, and the damage of the watermark to the quality of the multimedia video data may be greatly decreased. The accuracy for reflecting the multimedia video communication quality by the watermark is improved.

According to an embodiment of the present invention, the watermark is directly embedded in the original multimedia data before coding or in the video spatial domain, so that the watermark may completely equivalently reflect the intuitive quality of the multimedia. The accuracy of the multimedia video communication quality measurement is improved, and a quality loss degree caused by the multimedia coding process may be reflected.

According to an embodiment of the present invention, regarding the fitted PSNR as a quality measurement indication, which approximates a reference evaluation method, the accuracy of the objective quality evaluation for the multimedia video communication is improved.

According to an embodiment of the present invention, the effect of the watermark on the quality of the multimedia video data or video data may be reduced by performing smooth filtering post-processing for the watermark extraction, and the video communication quality may be ensured.

According to the above-mentioned measures provided in the embodiments of the present invention, the quality of the multimedia video communication may be accurately reflected under the precondition that the video communication quality is not damaged. Rapid and real-time communication quality measurement may be provided in the video communication to facilitate positioning network faults and other system faults. It may facilitate the operators to display a service quality in real time and improve customer trust degree. It may facilitate the manufacturers to perform tests and validations during a developing process of a video communication product, so that the performance of the video communication product may be improved and video communication services may be popularized.

DETAILED DESCRIPTION OF THE EMBODIMENTS

Various objects, technical solution and advantages of one or some embodiments of the present invention may be more clearly understood with reference to the detailed description of the accompanying drawings and embodiments.

As described above, in view of the contradiction between a damaged video quality and an accurate reflection of the video communication quality, according to the embodiments of the present invention, there is provided a method for measuring video communication quality based on a digital watermark, which is able to balance the effect of a embedded watermark on video quality and the accuracy of reflecting the video quality, so that the video quality is not damaged and the video communication quality is accurately measured.

The principle of the method is: according to characteristics of compressed video, the watermark is completely and uniformly embedded in the video spatial domain using a watermark embedding algorithm based on dividing into blocks and groups, and the PSNR is fitted using the watermark recovery accuracy rate. The so-called fitting is a data processing method for computation mathematics: based on a series of discrete data points, a curve is obtained to represent these data points, wherein the total distance between the curve and these discrete data points is minimal according to a certain optimal criterion. Here, the fitting refers to approximating the PSNR curve with the PRR (Pixel Recovered Rate) data, the object of which is to show that both of them are very approximate and have very high correlativity and consistency, and accordingly provide quality evaluation indications applicable to compressed video with low code rate. According to the embodiments of the present invention, the effect of the embedded digital watermark on the video quality is greatly reduced. The method of the embodiments of the present invention belongs to a Partial Reference Model method according to the above-mentioned quality evaluation categories. Without need of knowing the original video image, the method indirectly reflects the status of the original image using the original watermark image and the distorted watermark image which pass a transmission channel as a reference, and accordingly measures the video communication quality.

The objective quality measurement method for multimedia video communication based on a digital watermark according to the embodiments of the present invention includes three basic steps: embedding an original watermark in multimedia video data uniformly at a transmitting side, and transmitting the data to a receiving side; extracting a recovered watermark from the received multimedia video data through a process contrary to the process of watermark embedding at the receiving side; measuring objective quality of the multimedia video communication according to a distortion degree of the recovered watermark relative to the original watermark.

Embodiment 1 of the Present Invention

Figure 4:
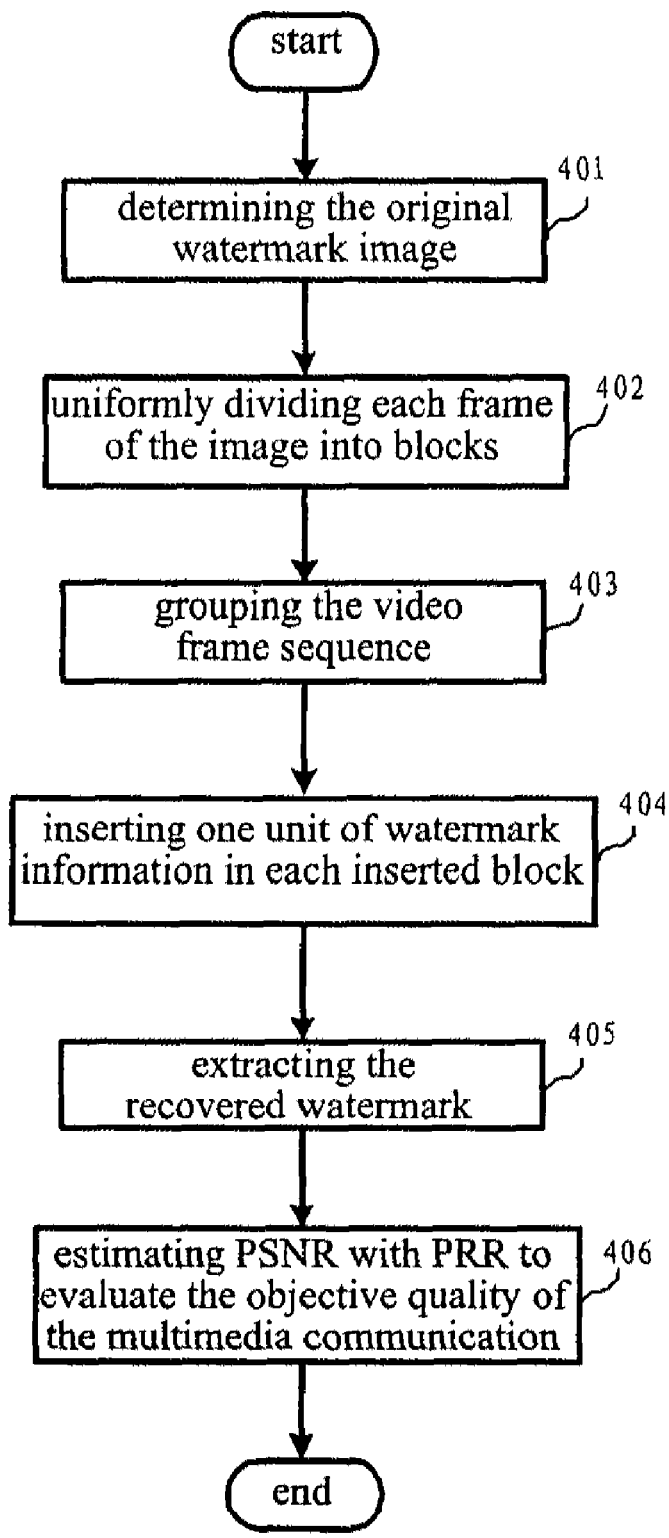
FIG. 4 is a flow chart of a method for measuring multimedia video communication quality according to an embodiment of the present invention.

FIG. 4 is a flow chart of an objective quality measurement method for multimedia video communication based on a digital watermark according to an embodiment of the present invention. Hereinafter the principle, implementation details and practical effect of each process will be described in detail.

With an example of video communication quality evaluation in the following description, the video data includes consecutive frame sequences. For the existing video, the B-DCT (Block-based DCT) coding and the motion compensated compression algorithm, such as H.263, H.264 and MPEG (Moving Picture Expert Group), are commonly used. Those skilled in the art may recognize that the method may be applicable to quality evaluation for other video communications with different coding or compression solutions and other multimedia video communications, and the object of the present invention may be similarly achieved without affecting the spirit and the scope of the present invention.

In Block 401, an original watermark image and a relevant algorithm or solution for video quality evaluation is determined. It needs to select a proper watermark at first for communication quality evaluation based on a digital watermark. In fact, selecting a proper digital watermark, which may not only reflect the video quality but also affect the video quality as little as possible, is important for the video communication quality evaluation.

Embodiment 2 of the Present Invention

Figure 1:
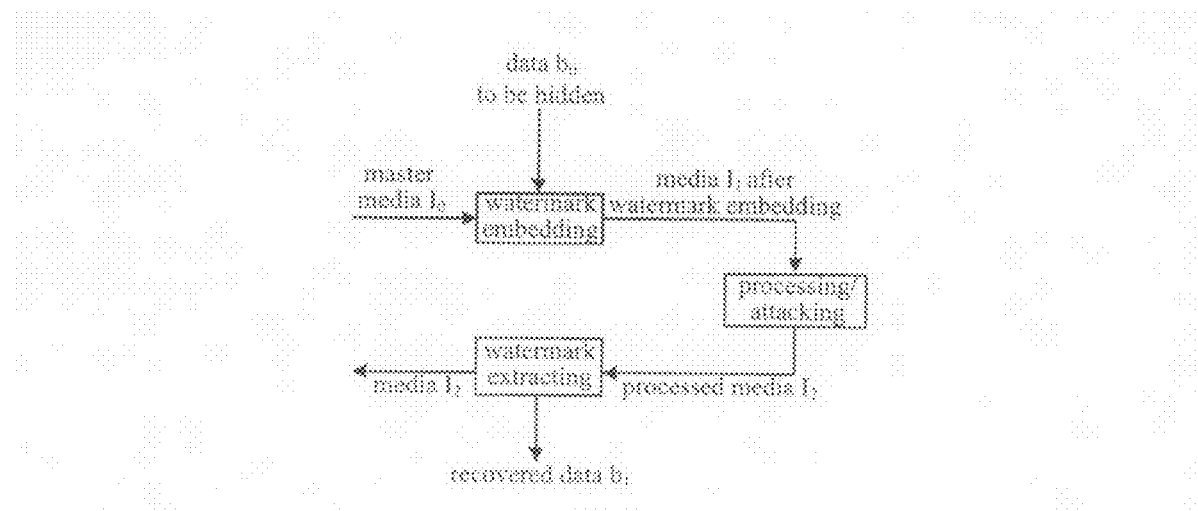
FIG. 1 is a schematic diagram illustrating a principle of digital watermark technology.
Figure 2:
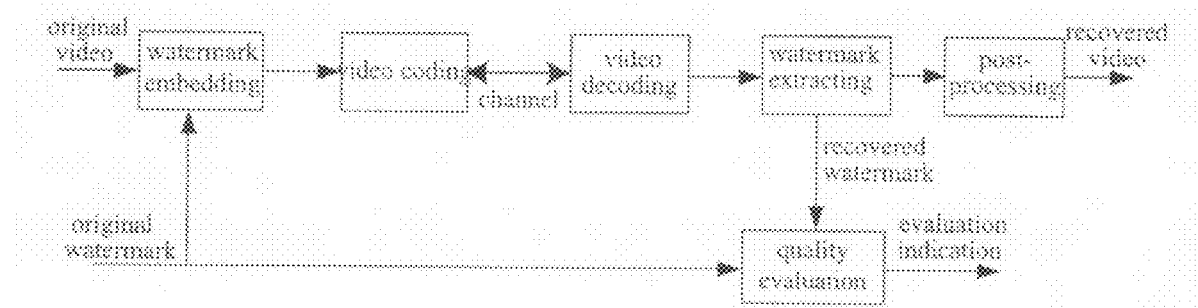
FIG. 2 is a block diagram illustrating a principle of a video communication quality measurement based on a digital watermark.
Figure 3:
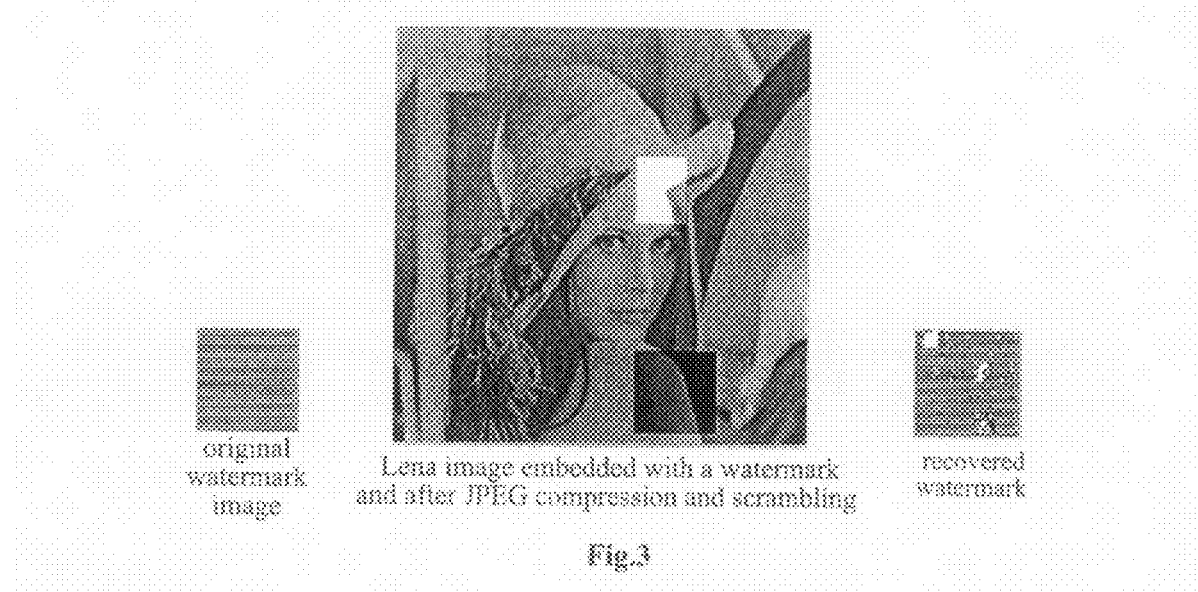
FIG. 3 is a schematic diagram illustrating a image embedded with a watermark and watermark recovery situation.

A bi-level image is selected in the embodiment, which is able to reduce the amount of information and appropriate for hiding watermark pixels. In addition, a black-and-white pattern, such as the watermark image shown in FIG. 3, is also used. Black-and-white means 0-and-1, so that the amount of information carried by such an image is not large, but the image has high sensitivity and strong robustness for detecting error codes.

Embodiment 3 of the Present Invention

A watermark image needs to be determined through a negotiation between both sides of communication, so in Embodiment 3 of the present invention, a transmitting side and a receiving side of the video communication negotiate through signaling communication to determine an original watermark and a specific solution for watermark embedment and watermark extraction.

After the original watermark is determined, the watermark will be uniformly embedded in a video image in accordance with the principle of the present invention. For the video compression coding standard of the B-DCT category, quantifying and coding are performed through a motion prediction, i.e. prediction and difference coding of a frame are performed with reference to anterior frames or posterior frames. A DCT transform is used for coding, so the transformed coding stream data is not completely equivalent to the former intuitive video image.

Embodiment 4 of the Present Invention

In this embodiment, a digital watermark is embedded in the video spatial domain before a DCT transform, i.e. an original watermark is uniformly embedded in original multimedia data at a transmitting side, then compression coding and data packeting (for packet switching network) or framing (for circuit-switched network) are performed, and finally the data are transmitted to a receiving side via a network.

On one side, the effect of the video compression on the video quality may be reflected; and on the other side, large number of zero macro blocks exist in a compressed prediction frame or reverse prediction frame, and embedding the watermark in the transform domain will greatly reduce the coding efficiency and affect the coded video quality. Therefore, the method for embedding the watermark in the spatial domain has advantages on the above-mentioned two sides over the method for embedding the watermark in the transform domain.

Preferred Embodiment 5

In addition, according to a principle of visual psychics, compared with chrominance value, human eyes are not sensitive to a light change in a luminance value of an image. In order to reduce the loss of the video quality due to watermark embedment, in this embodiment, for a color image, an original watermark is embedded in a luminance component of the original multimedia data, i.e. a watermark signal is embedded in the luminance component (Y component) of a video image sequence.

In addition, for a multi-channel image (e.g. a multi-channel remote sensing image), an original watermark may be embedded in one or more channels of the original multi-channel image data.

In block 402 of Embodiment 1 of the present invention, each frame of the image is uniformly divided into blocks of equal size at the transmitting side, and equal amount of the original watermark data is embedded in a part of the blocks or all of the blocks.

Assuming that each frame includes M rows×N columns pixels in which the M rows are numbered from 0 to M−1 and the N columns are numbered from 0 to N−1. Each frame is uniformly divided into blocks according to the following solution:

each frame is divided into m strips numbered from 0 to m−1, the strip i (i=0, 1, . . . , m−2) includes pixels from row i×$k_v$ to row (i+1)×$k_v$−1, and the strip m−1 includes pixels from row (m−1)×$k_v$ to row M−1, wherein m is a minimum integer which is greater than or equal to M/$k_v$;

the strip i (i=0, 1, . . . , m−1) is divided into n blocks numbered from i×n to (i+1)×n−1, the block i×n+j (0, 1, . . . , n−2) includes pixels from column j×$k_h$ to column (j+1)×$k_h$−1 of this strip, and the block n−1 includes pixels from column (n−1)×$k_h$ to column N−1, wherein n is a minimum integer which is greater than or equal to N/$k_h$;

equal amount of the original watermark data is embedded in each block of the obtained m×n blocks.

Figure 5:
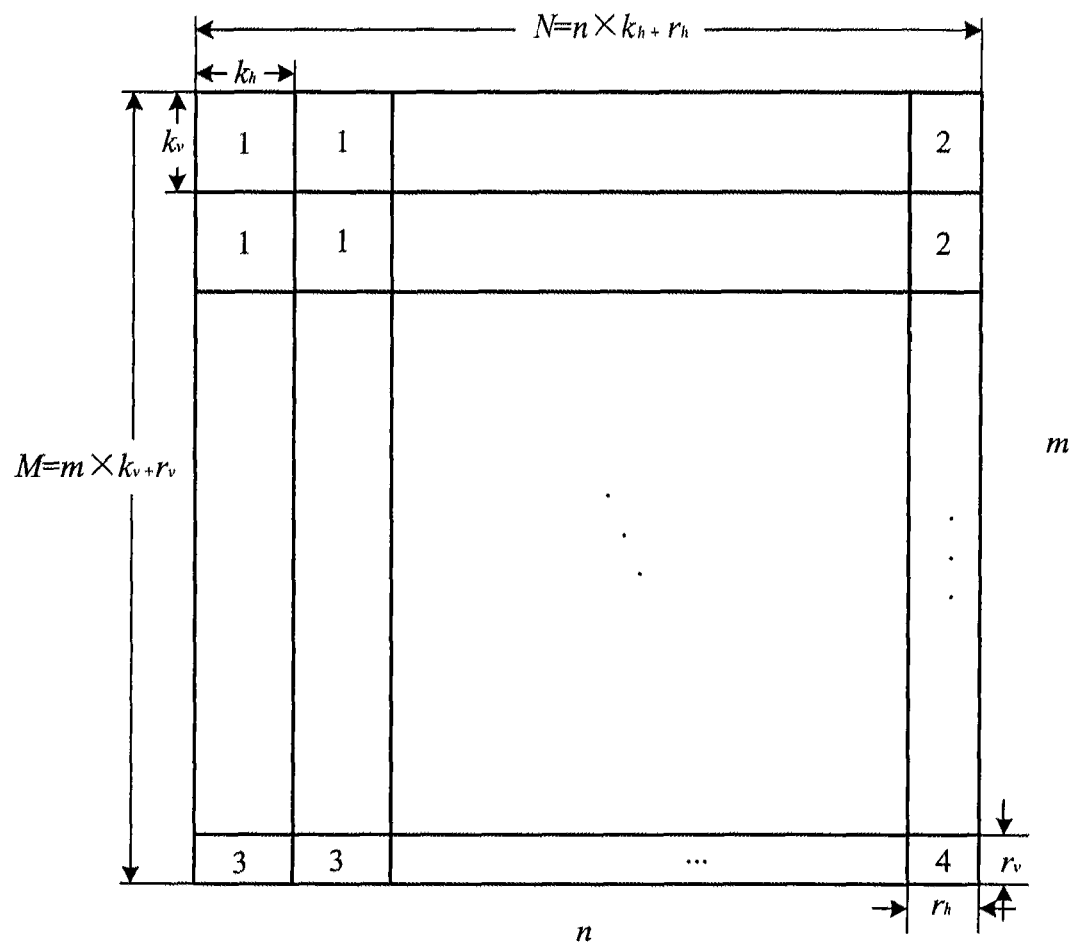
FIG. 5 is a schematic diagram illustrating uniformly dividing a frame into blocks of equal size according to an embodiment of the present invention.

The specific details are shown in FIG. 5. The size of the image in the video to be compressed is M×N, and the size of the watermark image is $\lceil M/k_v \rceil \times \lceil N/k_h \rceil$. Herein ⌈ ⌉ represents ceiling. One watermark pixel is embedded in each block whose size is $k_v \times k_h$ pixels in the original image, so that an error may be positioned and the effect of the watermark on the image quality is reduced. $k_v$ represents a vertical direction period of the embedment, and $k_h$ represents a horizontal direction period of the embedment.

In general, M or N is not divisible by $k_v$ or $k_h$, the remainders of them are respectively $r_v$ and $r_h$. Both of M and N are not divisible in a most complicated instance, thus four categories of areas exist in the top left part, on the right edge, on the lower edge and at the lower right corner of the image, which are marked with 1, 2, 3 and 4 in FIG. 5. The sizes of the blocks in the Area 1 are all $k_v \times k_h$ pixels. The sizes of the blocks in the Area 2 are all $k_v \times r_h$ pixels. The sizes of the blocks in the Area 3 are all $r_v \times k_h$ pixels. The size of the only one block in the Area 4 is $r_v \times r_h$ pixels.

The Area 1 is certain to exist, while the other areas may exist or not exist, depending on the situation of dividing. If the row number M is divisible by $k_v$, neither the Area 3 nor the Area 4 exists. Similarly, if the column N is divisible by $k_h$, neither the Area 2 nor the Area 4 exists.

By means of dividing into blocks, the watermark is distributed and embedded uniformly in each frame. A grouping embedding method is further needed to process different frames and embed the watermark in multiple frames. Especially for some instances, for example, when the communication bandwidth is very low or the selected watermark image is relatively large, it needs to further reduce the amount of the watermark data embedded in each frame of the image, i.e. it needs multiple frames to share a watermark.

In block 403, the video frame sequence is divided into groups at the transmitting side. Each group includes equal number of frames. At least two frames with equal interval in a same group are selected as the embedded frames, and equal number of blocks in each embedded frame are selected as the embedded blocks. Equal amount of the original watermark data are embedded in each embedded block.

To avoid significant effect on the quality and the code stream rate of a frame of an image due to embedding an integrate watermark image in each frame of the image to be compression-coded, the digital watermark image may be uniformly distributed in different frames. A part of the watermark is embedded in each frame of the image in the video sequence, or a sub-block is embedded in every other frame, etc., and the group of consecutive images is regarded as an embedding period. All the pixel points of the watermark are embedded in different positions in the image uniformly and dispersedly, and the watermark embedding positions of different images within a same embedding period are also different. In order to extract the embedded watermark conveniently at the decoding side, the position for embedding the watermark in each image within each embedding period is fixed.

Each frame is uniformly divided into L blocks numbered from 0 to L−1. The image may be uniformly divided into L strips horizontally or vertically, or uniformly divided in other ways. For example, the solution L=M×N shown in block 403. The method for embedding the original watermark also includes:

dividing the frame sequence into groups, each group including P×Q frames, from the frame 0 to the frame P×Q−1 of this group;

selecting the frame q×P (q=0, 1, ..., Q−1) of each group as the embedded frame;

selecting the block q+r×Q(r=0, ..., R−1, and q+r×Q≦L) of the frame q×P (q=0, 1, ..., Q−1) as the embedded block, wherein R is the maximum integer which is less than or equal to L/Q;

embedding equal amount of the original watermark data in all the embedded blocks of this group.

With an example of embedding with an interval, i.e. P=2, the details are described hereinafter. Each group includes 2Q frames, R=⌊L/Q⌋. The watermark is divided into Q blocks of equal size, and each block corresponds to one embedded frame. The frames 0, 2, 4, 6, 8, ..., 2Q−2 of this group of image is divided into blocks, and the blocks are numbered with 0, 1, 2, 3, ..., L−1 according to the order from the top to the bottom and from the left to the right.

In the frame 0 of this group, the blocks 0, Q, ..., R×Q are regarded as the embedded blocks;

In the frame 2 of this group, the blocks 1, Q+1, ..., R×Q+1 are regarded as the embedded blocks; and the rest may be deduced analogically.

Till in the frame 2Q−2 of this group, the blocks Q−1, 2Q−1, ..., (R+1)×Q−1 are regarded as the embedded blocks.

It is noted that the above-mentioned block number may exceed L later, so the embedded blocks with those numbers need to be canceled. The frames 1, 3, ..., 2Q−1 in the period will not be processed.

Then in block 404, 1-bit watermark information is embedded in each embedded block. How to embed a watermark pixel in each block is a key factor affecting the performance of the algorithm of the embodiment of the present invention.

Embodiment 6 of the Present Invention

In this embodiment, a method for embedding 1-bit data of the original watermark in one block of the multimedia video data includes:

setting an embedding strength as $A=2 \times Q_P - 1$, wherein $Q_P$ represents a quantization factor for the multimedia video communication compression coding;

calculating an average luminance value $\mu$ of the block of the multimedia video data according to pixels;

modifying the luminance value of each pixel in the block of the data according to b'=b+c, wherein b' is a modified value of the pixel, b is a value of the pixel before modification, and c is a modification amount;

the modification amount is calculated according to the following formula:

when the 1-bit original watermark data w=1, $$c = \begin{cases} -A/2 - \gamma & (0 \le \gamma < A/2) \\ 3A/2 - \gamma & (A/2 \le \gamma < 3A/2) \\ 3A/2 - \gamma & (3A/2 \le \gamma < 2A) \end{cases}$$

when the 1-bit original watermark data w=0, $$c = \begin{cases} A/2 - \gamma & (0 \le \gamma < A/2) \\ A/2 - \gamma & (A/2 \le \gamma < 3A/2) \\ 5A/2 - \gamma & (3A/2 \le \gamma < 2A) \end{cases}$$

wherein $\gamma$ is a remainder of $\mu$ being divided by 2A.

In block 405, a recovered watermark is extracted from the received video data at the receiving side through a process contrary to the process of watermark embedding. Corresponding to the watermark embedment, the watermark extraction is exactly a reverse process of the above-mentioned process: grouping and determining the embedded frames; determining the embedded blocks in each embedded frame; extracting the watermark information from each block. As for how to determine the embedded frames and further determine the embedded blocks, the details will not be described here. A method for extracting a watermark from an embedded block will be described.

Embodiment 7 of the Present Invention

In this embodiment, a method for extracting 1-bit data of the recovered watermark from one block of the received video data based on the watermark embedding algorithm described in the embodiment 6 is:

setting an embedding strength as $A=2 \times Q_P - 1$, wherein $Q_P$ represents the quantization factor for the multimedia video communication compression coding;

calculating an average value $\mu'$ of the block of the received multimedia video data according to pixels;

calculating extracted data w' of the recovered watermark according to the following formula:

$$w' = \begin{cases} 0 & (0 \leq \gamma' < A) \\ 1 & (A \leq \gamma' < 2A) \end{cases}$$

wherein γ' is a remainder of μ' being divided by 2A.

For all the embedded blocks in all the embedded frames in a group, a frame of integral watermark image may be recovered through recovering the watermark bit information.

In block 406, a PSNR is evaluated using a PRR (Pixel Recovered Rate) of the recovered watermark relative to the original watermark at the receiving side to measure the objective quality of the multimedia video communication.

The pixel recovery rate of the watermark is defined as PRR for evaluating the video quality by means of the watermark. The PRR refers to comparing the distorted watermark with the original watermark to obtain a ratio of the number of correct watermark pixels after distortion to the total number of the watermark pixels. I.e., PRR=100*(the number of the correct pixels in the distorted watermark/the total number of the watermark image pixels) %

Both video compression and error codes generated during a transmission process will affect the PRR value. Experiments show that although the PRR of the recovered watermark and the PSNR of the video quality to be evaluated are not completely identical, there is a fixed, even an approximately linear relationship between them. It is indicated that there is a very strong correlativity relationship between the quality evaluation result of the distorted video and the PSNR. Therefore, in a case that there is no reference video and the PSNR cannot be obtained, by means of establishing a relationship between the PRR and the PSNR, the PSNR of the distorted video is evaluated according to the PRR, and the object of evaluating the decoded and recovered video quality is achieved.

Embodiment 8 of the Present Invention

Based on the embodiment 1, according to statistic data of a multimedia video communication experiment, the estimation value of the PSNR is fitted using a linear function of the PRR according to the MSE (Mean Square Error) criterion to measure the objective quality of the multimedia video communication in this embodiment.

Figure 6:
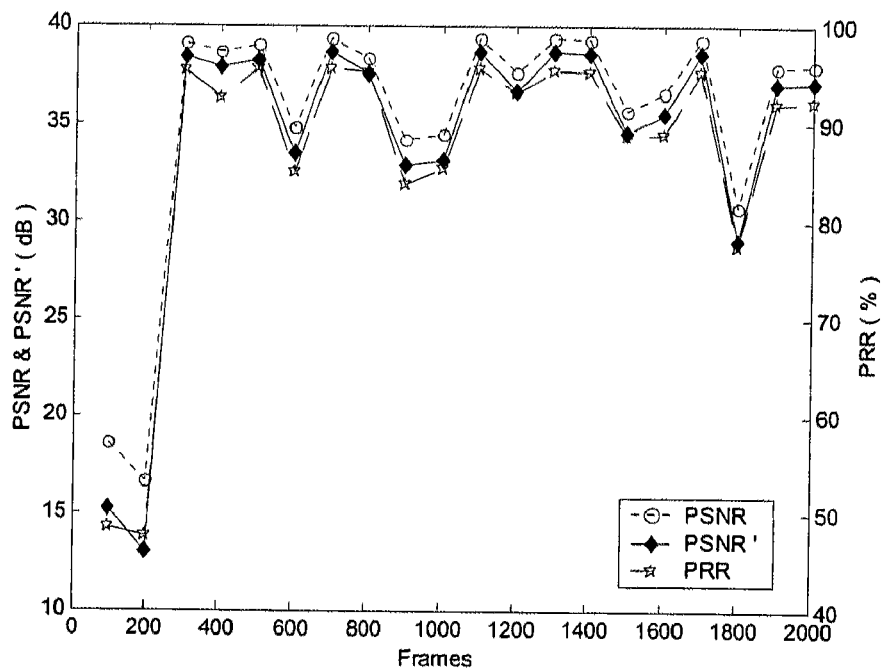
FIGS. 6 (*a*) and (*b*) are schematic diagrams illustrating experimental results according to the embodiment 8 of the present invention.
Figure 6:
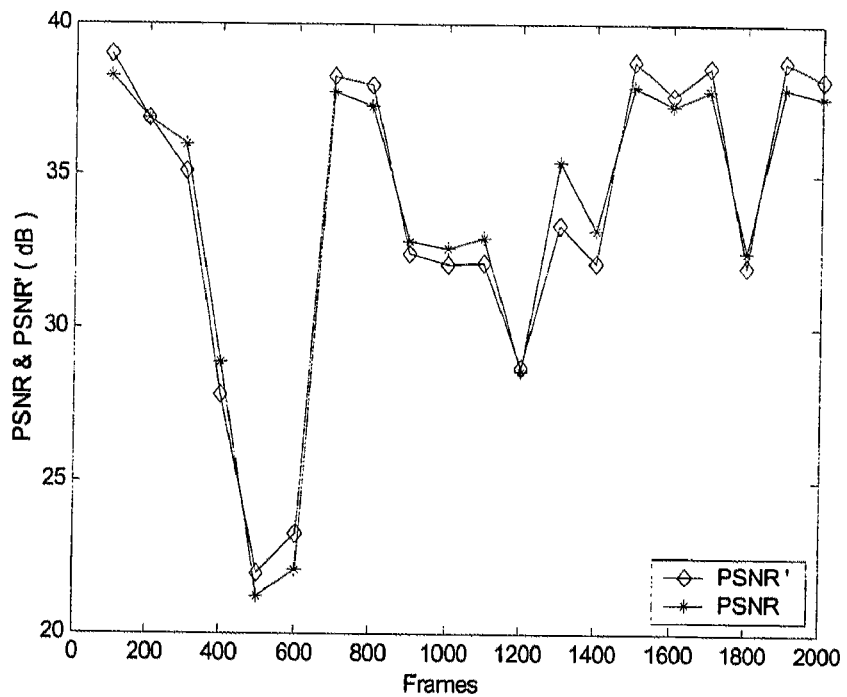

Based on the embedding algorithm described above, the watermark information is embedded in a standard test sequence Claire (in QCIF format). Then, the video sequence embedded with the watermark is compressed according to a video compression standard H.263. The compressed video stream enters the decoder after channel "transmission" for video decoding. Finally, the embedded digital watermark is extracted from the decoded video and the PRR is calculated. A BSC (Binary Symmetric Channel) is used to simulate the channel for simplicity. The noise is uniformly distributed random noise. The average code error rate of the channel is $10^{-5}$. The first diagram in FIG. 6 shows the PSNR of the recovered video relative to the original video and the PRR of the watermark. It could be seen there is better consistency between the PSNR and the PRR.

In order to measure the similarity degree between the PSNR curve and the PRR curve, a normalized correlation efficiency of them in the diagram is calculated:

$$\rho = Cov(X,Y)/\sqrt{D(X)}\sqrt{D(Y)}$$

In the formula, X and Y respectively represent the PSNR and the PRR. Cov(X,Y) represents the covariance of X and Y. D(X) and D(Y) respectively represent the variances of X and Y.

Based on the experimental data, ρ=98.3%. It is obvious that there is a very strong correlativity between the PRR curve and the PSNR curve. The PSNR may be mapped by the PRR due to the strong correlativity between the PRR and the PSNR, i.e. a one-order function $$PSNR' = a_0 + a_1 \times PRR$$

is used to fit the actual PSNR. According to the MSE criterion, using the data in the diagram, when the mean square error $$MSE = \frac{1}{N} \sum_n (PSNR_n - PSNR'_n)^2$$

is the minimum value, $a_0 = -16.9079$, $a_1 = 0.5632$. The estimation PSNR' of the PSNR is calculated, as shown in FIG. 6(*a*). Comparing the PSNR' with the PSNR, the MSE of them 0.735 is obtained. It could be seen that the PSNR' fits the PSNR very well.

In order to further validate the accuracy of the PSNR' as the PSNR estimation, the code error rate of the channel is changed to $1.5 \times 10^{-5}$. The obtained PSNR of the recovered video and the estimation value PSNR' obtained through the PRR mapping are shown in FIG. 6(*b*). The obtained correlation coefficient ρ of the two groups of data is 98.6%, and the MSE is only 0.696. It is obvious that the PSNR' fits the PSNR very well.

Embodiment 9 of the Present Invention

In this embodiment, in order to further eliminate a loss of the video quality caused by the watermark embedment, the received video image will be post-processed after the recovered watermark is extracted to eliminate the effect of the watermark embedment. The post-processing may be smoothing filtering, median filtering, neural network filtering, mathematical morphology filtering or filtering based on fuzzy mathematics methods.

The watermark is embedded based on a block. If the embedding strength is too high, it will result in man-induced block effect and lead to decreased image quality. If the embedding strength is too low, it is difficult to resist the effect caused by video compression and results in a very low PRR of the recovered watermark. Thus in the embodiment of the present invention, a self-adaptive watermark embedding method is selected, and on restoring the watermark, smoothing filtering is performed for the image embedded with the watermark at the decoding side. An experiment shows that the effect of the watermark on the video objective quality may be effectively weakened in this way.

Embodiment 10 of the Present Invention

In this embodiment, the performance of the method for measuring the multimedia video communication quality based on a digital watermark according to the embodiment of the present invention is evaluated through experiments. The results are shown in Table 1 and Table 2.

Table 1 and Table 2 respectively show the effect on the coded video quality and the bit rate caused by watermark embedding using the method of the embodiment of the present invention. It could be seen that the effect on the multimedia video data quality brought by the method of the embodiment of the present invention is little.

Table 1 at the same bit rate, effect on coded video quality caused by the watermark embedment (the frame rate is 30 frames/s)

| Bit rate (bps) | 20K | 50K | 80K |
|---|---|---|---|
| PSNR before embedding (dB) | 37.60 | 41.51 | 43.87 |
| PSNR after embedding (dB) | 37.44 | 41.42 | 43.80 |

Table 2 with the same quantization factor, effect on original video quality and bit rate caused by the watermark embedment

| Quantization step length | | $Q_P = 5$ | $Q_P = 8$ | $Q_P = 12$ |
|---|---|---|---|---|
| Before embedding | Bit rate (bps) | 66.67K | 33.60K | 20.23K |
| | PSNR (dB) | 40.44 | 37.59 | 35.31 |
| After embedding | Bit rate (bps) | 69.60K | 35.97K | 21.02K |
| | PSNR (dB) | 40.37 | 37.49 | 35.24 |

Those skilled in the art may recognize that the technical solution of the embodiment of the present invention also may be used in conjunction with quality measurement methods with reference and achieve better effect through information fusion, etc.

While the present invention has been illustrated and described with reference to some preferred embodiments, those skilled in the art may recognize that various variations and modifications may be made without departing from the spirit and scope of the present invention as defined by the accompanying claims.

The invention claimed is:

1. A method for measuring multimedia video communication quality, comprising:
    uniformly dividing the multimedia video data frames into blocks of equal size;
    embedding an equal amount of the original watermark data in a part of the blocks or all of the blocks at a transmitting side;
    transmitting the multimedia video data to a receiving side;
    extracting a recovered watermark from the received multimedia video data at the receiving side; and
    calculating a distortion degree of the recovered watermark relative to the original watermark,
    wherein uniformly dividing the multimedia video data frames into blocks of equal size, and embedding an equal amount of the original watermark data in a part of the blocks or all of the blocks at a transmitting side comprises: dividing the multimedia video data into groups at the transmitting side, each group comprising an equal number of frames, and selecting at least two frames with an equal interval in a same group as embedded frames, uniformly dividing each of the embedded frame into a plurality of blocks of equal size, selecting an equal number of blocks from the plurality of blocks as embedded blocks, and embedding an equal amount of the original watermark data in each of the embedded blocks.

2. The method of claim 1, further comprising: performing compression coding or data packaging or framing at the transmitting side, and transmitting the data to the receiving side.

3. A method for measuring multimedia video communication quality, comprising:
    uniformly dividing the multimedia video data frames into blocks of equal size;
    embedding an equal amount of the original watermark data in a part of the blocks or all of the blocks at a transmitting side;
    transmitting the multimedia video data to a receiving side;
    extracting a recovered watermark from the received multimedia video data at the receiving side; and
    calculating a distortion degree of the recovered watermark relative to the original watermark,
    wherein each multimedia video data frame comprises M rows×N columns pixels in which the M rows are numbered from 0 to M−1 and the N columns are numbered from 0 to N−1, and uniformly dividing a multimedia video data frame into blocks of equal size comprises:
        dividing each multimedia video data frame into m strips numbered from 0 to m−1, the strip i(i=0, 1, . . . , m−2) comprising pixels from row i×$k_v$ to row (i+1)×$K_v$−1, and the strip m−1 comprising pixels from row (m−1)×$k_v$ to row M−1, wherein m is a minimum integer greater than or equal to M/$k_v$; if m=M/$k_v$, the strip m−1 comprising zero row of pixels;
        dividing the strip i(i=0, 1, . . . , m−1) into n blocks numbered from i×n to (i+1)×n−1, the block i×n+j(0, 1, . . . ,n−2) comprising pixels from column j×$k_h$ to column (j+1)×$k_h$−1 of this strip, and the block n−1 comprising pixels from column (n−1)×$k_h$ to column N−1, wherein n is a minimum integer greater than or equal to N/$k_h$; if n=N/$k_h$, the strip n−1 comprising zero column of pixels; and
    embedding an equal amount of the original watermark data in each of the obtained m×n blocks.

4. The method of claim 1, wherein each frame of the multimedia video data is uniformly divided into L blocks numbered from 0 to L−1, and the embedding the original watermark further comprises:
    dividing a frame sequence into groups, each group comprising P×Q frames, which sequentially are frame 0 to frame P×Q−1 of the group;
    selecting a frame q×P(q=0, . . . ,Q−1) of each group as the embedded frame;
    selecting a block q+r×Q(r=0, . . . ,R−1,and q+r×Q≦L) of the embedded frame q×P(q=0, . . . ,Q−1) as the embedded block, wherein R is a maximum integer less than or equal to L/Q ; and
    embedding an equal amount of the original watermark data in all the embedded blocks of the group.

5. A method for measuring multimedia video communication quality, comprising:
    uniformly dividing the multimedia video data frames into blocks of equal size;
    embedding an equal amount of the original watermark data in a part of the blocks or all of the blocks at a transmitting side;
    transmitting the multimedia video data to a receiving side;
    extracting a recovered watermark from the received multimedia video data at the receiving side;
        calculating a distortion degree of the recovered watermark relative to the original watermark; and
        determining a bit number of the original watermark data embedded in a part of the blocks or all of the blocks according to the size of the data block,
    wherein embedding 1-bit data of the original watermark in the multimedia video data block comprises:
        calculating an average value µ of the multimedia video data block according to pixels;
        modifying a value of each pixel in the multimedia video data block according to b'=b+c , wherein b' is a modified value of a pixel, b is a value of the pixel before modification, and c is a modification amount, wherein the modification amount is calculated according to the following formula:

when the original watermark data bit is 1, $$c = \begin{cases} -A/2 - \gamma & (0 \le \gamma < A/2) \\ 3A/2 - \gamma & (A/2 \le \gamma < 3A/2) \\ 3A/2 - \gamma & (3A/2 \le \gamma < 2A) \end{cases}$$

when the original watermark data bit is 0, $$c = \begin{cases} A/2 - \gamma & (0 \le \gamma < A/2) \\ A/2 - \gamma & (A/2 \le \gamma < 3A/2) \\ 5A/2 - \gamma & (3A/2 \le \gamma < 2A) \end{cases},$$

and wherein $\gamma$ is a remainder of $\mu$ being divided by $2A$, A represents an embedding strength and is equal to $2 \times Q_P - 1$, and $Q_P$ represents a quantization factor for the multimedia video communication compression coding.

6. A method for measuring multimedia video communication quality, comprising:

uniformly dividing the multimedia video data frames into blocks of equal size;

embedding an equal amount of the original watermark data in a part of the blocks or all of the blocks at a transmitting side;

transmitting the multimedia video data to a receiving side;

extracting a recovered watermark from the received multimedia video data at the receiving side; and calculating a distortion degree of the recovered watermark relative to the original watermark; and determining a bit number of the original watermark data embedded in a part of the blocks or all of the blocks according to the size of the data block, wherein extracting a data bit of the recovered watermark from the received multimedia video data block comprises:

calculating an average value $\mu'$ of the received multimedia video data block according to pixels; and calculating extracted data w' of the recovered watermark according to the following formula:

$$w' = \begin{cases} 0 & (0 \le \gamma' < A) \\ 1 & (A \le \gamma' < 2A) \end{cases},$$

and wherein $\gamma'$ is a remainder of $\mu'$ being divided by $2A$, A represents an embedding strength and is equal to $2 \times Q_{P\_}1$, and $Q_P$ represents a quantization factor for the multimedia video communication compression coding.

7. The method of claim 1, further comprising: calculating a Peak Signal-to-Noise Ratio using a Pixel Recovery Rate of the recovered watermark relative to the original watermark to measure objective quality of the multimedia video communication.

8. The method of claim 7, wherein the calculating a Peak Signal-to-Noise Ratio using a Pixel Recovery Rate of the recovered watermark relative to the original watermark to measure objected quality of the multimedia video communication comprises: fitting to obtain an estimated value of the Peak Signal-to-Noise Ratio using a linear function of the Pixel Recovery Rate of the recovered watermark relative to the original watermark based on statistic data of a multimedia video communication experiment and according to a Mean Square Error criterion to measure the objective quality of the multimedia video communication.

9. The method of claim 1, wherein calculating the distortion degree of the recovered watermark relative to the original watermark measures the objective quality of the multimedia video communication.

10. The method of claim 9, wherein the calculating the distortion degree of the recovered watermark relative to the original watermark comprises: calculating the distortion degree of the recovered watermark relative to the original watermark using the Pixel Recovery Rate of the recovered watermark relative to the original watermark.

11. The method of claim 1, further comprising: on extracting the recovered watermark, post-processing the received multimedia video data to eliminate effect of the watermark embedment, wherein the post-processing comprises one of the following: smoothing filtering, median filtering, neural network filtering, mathematical morphology filtering and filtering based on fuzzy mathematics methods.

12. The method of claim 1, further comprising: determining the original watermark, relevant parameters and a step for embedding the original watermark and extracting the recovered watermark through a communication negotiation between the transmitting side and the receiving side.

13. The method of claim 1, further comprising: determining the original watermark, the relevant parameters and the strategy for embedding the original watermark and extracting the recovered watermark at the transmitting side, and informing the receiving side before communication.

14. The method of claim 2, wherein for a color image, the original watermark is embedded in a luminance component of the original multimedia data, and wherein for a multi-channel image, the original watermark is embedded in one or more channels of the original multi-channel image data.

15. The method of claim 1, wherein the original watermark is a bi-level image.

* * * * *

UNITED STATES PATENT AND TRADEMARK OFFICE
CERTIFICATE OF CORRECTION

PATENT NO.         : 8,184,164 B2                                           Page 1 of 1
APPLICATION NO.    : 11/793546
DATED              : May 22, 2012
INVENTOR(S)        : Fuzheng Yang et al.

It is certified that error appears in the above-identified patent and that said Letters Patent is hereby corrected as shown below:

Column 16, line 16,   Capital "K" should be lowercase "k"
    Column 16, line 19,   Capital "K" should be lowercase "k"

Signed and Sealed this
Twenty-fifth Day of September, 2012

David J. Kappos
*Director of the United States Patent and Trademark Office*